United States Patent [19]

Barrett et al.

[11] 3,896,416

[45] July 22, 1975

[54] DIGITAL TELECOMMUNICATIONS APPARATUS HAVING ERROR-CORRECTING FACILITIES

[75] Inventors: Robert Barrett, Welwyn; John Ashley Gordon, Hatfield, both of England

[73] Assignee: British Secretary of State for Defence, London, England

[22] Filed: May 11, 1973

[21] Appl. No.: 359,375

[30] Foreign Application Priority Data

May 15, 1972 United Kingdom.............. 22705/72

[52] U.S. Cl............... 340/146.1 AL; 340/146.1 AX

[51] Int. Cl............................................. G06f 11/12

[58] Field of Search.................. 179/15 AP, 15 AE; 340/146.1 AL, 146.1 AX

[56] References Cited

UNITED STATES PATENTS

| | | | |
|---|---|---|---|
| 3,078,443 | 2/1963 | Rose | 340/146.1 AX |
| 3,291,972 | 12/1963 | Helm | 340/146.1 AL |
| 3,359,543 | 12/1967 | Corr et al. | 340/146.1 AX |
| 3,372,376 | 3/1968 | Helm | 340/146.1 AX |
| 3,478,313 | 11/1969 | Srinivasan | 340/146.1 AL |
| 3,496,549 | 2/1970 | Tong | 340/146.1 AX |
| 3,562,709 | 2/1971 | Srinivasan | 340/146.1 AL |
| 3,582,878 | 6/1971 | Bossen et al. | 340/146.1 AL |
| 3,657,700 | 4/1972 | Lutzker | 340/146.1 AX |
| 3,668,631 | 6/1972 | Griffith | 340/146.1 AX |

*Primary Examiner*—Charles E. Atkinson
*Attorney, Agent, or Firm*—Elliott I. Pollock

[57] ABSTRACT

Digital telecommunications apparatus for decoding signals according to a systematic ($n$, $k$, $t$) block code, including means for providing representations on separate digit-signal lines simultaneously of the digital signals belonging to each received block of signals, a set of syndrome element deriving circuits having inputs connected to the said digit-signal lines, a set of $k$ error-detecting circuits responsive to various combinations of outputs of the syndrome-element deriving circuits for detecting when associated information digit signals have been corrupted or incorrectly identified, and a set of $k$ correcting gates comprising modulo-two adders connected to the error-detecting circuits and to predetermined ones of the said digit-signal lines on which information-digit signals should be represented, for providing corrected representations of the information-digit signals. The apparatus preferably comprises facilities for encoding and decoding signals according to any selected one of a set of predetermined block codes having different rates and different error-correcting capabilities. Circuits for a preferred set of codes are described, and a multiplexing system for sending from one to eleven digital messages according to the preferred codes.

20 Claims, 10 Drawing Figures

DIGITAL TELECOMMUNICATIONS APPARATUS HAVING ERROR-CORRECTING FACILITIES

BACKGROUND OF THE INVENTION

The present invention relates to digital telecommunications apparatus having error-correcting facilities.

There is a growing demand for digital communication facilities over all kinds of telecommunications links, and a requirement for a high degree of reliability in the messages transmitted. Limitations and faults of the available telecommunications links, and adverse radio propagation conditions occurring in any radio links involved, do however tend to distort the signals transmitted so that some of the signals received are so corrupted that they are incorrectly identified at the receiver.

Various techniques have been devised to overcome these difficulties. The signals are usually in binary form. One technique, known as block coding, is to split the binary information signals which are to be sent into blocks, each block comprising a predetermined number $k$ of information digits. From each block of $k$ information digits a larger number of $n$ digits is derived according to a chosen code, so as to satisfy the matrix equation $$[H]\begin{bmatrix} d_n \\ d_1 \end{bmatrix} = \begin{bmatrix} O \\ \vdots \\ O \end{bmatrix} \leftarrow \cdots \quad (1)$$

where H is a matrix of $n-k = r$ rows and $n$ columns, called the parity check matrix of the code (effectively the key to the code); $d_1, d_2 \ldots d_n$ are the derived digits, the right-hand-side is a vector having all elements zero, and the additions involved in forming the matrix product are performed according to the rules of modulo-two arithmetic. The $n$ derived digits are transmitted to the required destination, where they are applied to a checking apparatus. To indicate the possibility that one or more of the digits as received may have been corrupted in transmission or incorrectly identified at the receiver, the received digits will be represented by symbols $e_1, e_2 \ldots e_n$. The checking apparatus will use them to derive at least some of the elements of the matrix product $$[H]\begin{bmatrix} e_n \\ e_1 \end{bmatrix} = \begin{bmatrix} S_1 \\ \vdots \\ S_r \end{bmatrix} \leftarrow \cdots \quad (2)$$

using modulo-two addition. This product is called the syndrome of that block of received digits. If none of the received digits has been corrupted or incorrectly identified, then clearly $e_1 = d_1$, $e_2 = d_2$, $\ldots$ $e_n = d_n$ and all the elements $S_1, S_2, \ldots S_r$ of the syndrome will be zeros. However if one or more of the received digits has been corrupted or incorrectly identified, the syndrome will probably have at least one non-zero element. If the parity check matrix has been judiciously chosen, the corrupted digits may be identified and corrected from a knowledge of the syndrome elements. Useful codes will have an error-correcting capability expressed by an integer $t$, that is to say that if any combination of $t$, or less than $t$, of the digits $e_1, e_2 \ldots e_n$ have been corrupted, the positions of the corrupted digits can be unambiguously determined from the digits of the syndrome. Another important property of any given code is its rate $k/n$, that is the ratio of the number of information digits carried to the number of digit-signals actually transmitted.

Two types of block code are comparatively simple — the Hamming codes which are single-error-correcting codes useful when only a comparatively small increase in reliability is required, and repetition codes, which have only one information digit, repeated $(2t+1)$ times, in each block (that is $n = 2t+1$ and $k = 1$). The repetition codes are useful where a large improvement in reliability is required and a low rate is acceptable. However, in many practical applications, it would be advantageous to use a code of medium rate and medium error-correcting ability. While some such codes have been devised, their derivation is extremely abstruse and they are difficult to describe or define. Books written on the subject include "Algebraic Coding Theory" by E Berlekamp, "Error-Correcting Codes" by W W Peterson, and "Information Theory and Reliable Communications" by R Gallager. Clearly it is desirable to choose a code allowing the maximum rate achievable for any desired error-correction capability $t$. It is also of great practical importance to choose a code which will allow the encoding, decoding and error-correcting procedures to be achieved by reasonably simple logic circuits, to minimize both capital and maintenance costs. Some of the mathematically interesting and theoretically effective codes which have been devised have not been used because it appears impossible to device any reasonably economical circuits for using them. From an academic point of view, much attention has been given to long codes (having a large $n$) of a cyclic kind, with which a sequence of iterative logical operations can be applied to check, and if necessary correct, each received digit in turn; while some such codes have been developed for practical use, the need for sequential iterative operations limits the speed of the encoding and decoding operations.

Many known codes are of the kind known as systematic block codes, which are distinguished by the property that they include the $k$ information digits which are to be carried among the $n$ digits which are actually transmitted to represent any given block of signals. The parity check matrix for a systematic block code may have a set of $r$ different single-weight columns, that is to say columns each containing $(r-1)$ zeros and only a single one, with the one placed in different rows in different coluns of the set. it may be arranged, for instance, so that the first $k$ digits in each transmitted block are the information digits.

Given the parity check matrix for any code, it is possible to form other apparently different codes all having the same rate and the same error-correcting ability by various modifications, e.g. altering the order of the columns, altering the order of the rows, adding all the elements in any row to the corresponding elements in any other row, or applying any number of such modifications consecutively. Such modifications may make a code more convenient or less convenient for practical use. Such codes will hereinafter be called equivalent codes. A code having particular values of $n$, $k$ and $t$ may be called an $(n, k, t)$ code.

SUMMARY OF THE INVENTION

It is an object of the invention to provide digital telecommunications apparatus using block coding to achieve error-correction, which is versatile, allows fast operation, and can be made with comparatively simple logic circuits.

According to the present invention, there is provided digital telecommunications apparatus for decoding signals according to an $(n, k, t)$ block code, including means for providing representations on separate digit-signal lines simultaneously of the digital signals belonging to each received block of signals; a set of syndrome element deriving circuits comprising modulo-two adder circuits and having inputs connected to the said digit-signal lines for simultaneously deriving all the syndrome elements from a block of received signals; a set of error-detecting circuits, connected to the outputs of the syndrome-element deriving circuits, for simultaneously deriving indications of any errors which have occurred in information digit positions within a block of received signals, comprising coincidence gate circuits responsive to given combinations of syndrome elements resulting from errors occurring in the said information digit positions; and a set of $k$ correcting gates comprising modulo-two adders connected to the error-detecting circuits and to predetermined ones of the said digit-signal lines on which information-digit signals should be represented, for providing corrected representations of the information digit signals.

With this arrangement it will be understood that the syndrome deriving circuits can all operate simultaneously, providing outputs representing the syndrome elements on separate output lines; the error-detecting circuits can all operate simultaneously, providing outputs on separate lines to indicate any information-digit signals which have been corrupted or wrongly identified; and the correcting gates can operate simultaneously to pass correct information-digit signals and to correct erroneous information-digit signals by modulo-two summation with the corresponding outputs of the error-detector circuits; the sequence of syndrome derivation, error detection, and modulo-two summation can be completed comparatively quickly.

The apparatus may include a first buffer store having $n$ parallel outputs, which can be arranged to apply received signals to respective ones of the digit-signal lines, and a second buffer store having $k$ parallel inputs connected to the outputs of the correcting-gates.

For encoding, the apparatus may also include a buffer store having $k$ outputs connected to a set of information-digit signal lines, a parity-check encoder circuit having inputs connected to the information-digit signal lines and $r$ separate outputs on which it will develop parity-check digit signals, and another buffer store having $n$ parallel inputs of which $k$ are connected to the information-digit signal lines and $r$ are connected to the outputs of the parity-check encoder circuit.

The apparatus preferably comprises facilities for encoding and decoding signals according to any selected one of a set of predetermined block codes having different rates and different error-correcting capabilities. The set of codes may include an (11, 7, 1) single-error-correcting code, an (11, 4, 2) two-error-correcting code, and an (11, 1, 5) five-error-correcting code. The set of codes may also include an (11, 2, 3) three-error-correcting code. The apparatus may also provide for transmitting signals directly without any coding or error-correcting facility. The preferred (11, 7, 1) code has the parity-check matrix $$\begin{bmatrix} 10000010110 \\ 01000101011 \\ 00101001101 \\ 00011110001 \end{bmatrix}$$

The preferred (11, 4, 2) code has the parity-check matrix $$\begin{bmatrix} 10000001110 \\ 01000001101 \\ 00100001010 \\ 00010001001 \\ 00001000110 \\ 00000100101 \\ 00000010011 \end{bmatrix}$$

It may be noted that a closely similar code has been listed by Slepian, in the Bell System Technical Journal, vol 35 (1956) page 217, and Slepian's code could be used as an alternative.

The preferred (11, 2, 3) code has the parity-check matrix $$\begin{bmatrix} 10000000001 \\ 01000000001 \\ 00100000001 \\ 00010000010 \\ 00001000010 \\ 00000100010 \\ 00000010011 \\ 00000001011 \\ 00000000111 \end{bmatrix}$$

The (11, 1, 5) code is a repetition code with the parity-check matrix $$\begin{bmatrix} 10000000001 \\ 01000000001 \\ 00100000001 \\ 00010000001 \\ 00001000001 \\ 00000100001 \\ 00000010001 \\ 00000001001 \\ 00000000101 \\ 00000000011 \end{bmatrix}$$

These codes are advantageous as they offer the highest attainable rates for codes of block length $n = 11$ with a selection of error-correcting capabilities, and can all be utilzed with comparatively simple circuits. It is also convenient that all the codes have the same block length $n = 11$.

An embodiment of the invention will now be described by way of example only, with reference to the accompanying drawings, of which:

Figure 1:
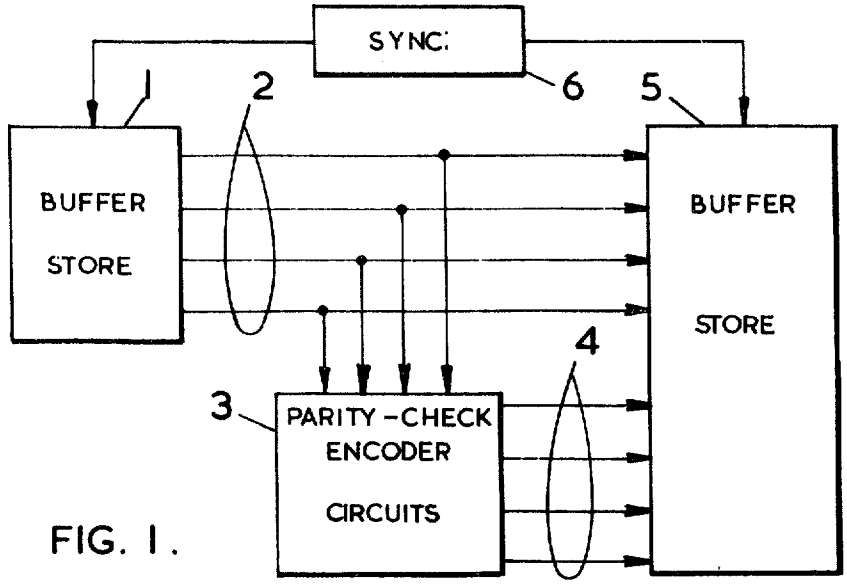
FIG. 1 is a schematic block circuit diagram of apparatus for encoding signals according to an $(n, k, t)$ systematic block code.

FIG. 1 shows encoder apparatus, including a buffer store 1 which is arranged to receive (by any suitable means not shown) binary information-digit signals for transmission. These information-digit signals are received in blocks comprising $k$ digits and the buffer store 1 is arranged to apply the $k$ digit-signals of each block to $k$ separate output lines 2. The buffer store 1 may for instance be a shift register with parallel output lines. A set 3 of parity check encoder circuits, comprising $r$ encoder circuits with separate output lines 4, having inputs connected to the output lines 2 of the store 1. Another buffer store 5 has $n$ parallel inputs comprising $k$ inputs separately connected to the lines 2 and $r$ inputs separately connected to the lines 4. A synchronizing circuit 6 controls the entry of signals into store 1 and the output of signals from store 5.

In operation, representations of $k$ information-signals are applied to respective ones of the lines 2 simultaneously. The $r$ parity-check encoder circuits operate in response to these signals, simultaneously, each generating one parity-check digit signal according to the code in use. The parity-check digit signals are entered with the informationdigit signals into the buffer store 5 to make up the full block of $n$ signals for transmission. Details of parity-check encoder circuits for the preferred codes are given hereinafter. The blocks of signals formed in the store 5 are passed out for transmission by any suitable means not shown.

To describe the operation of the parity-check encoder circuits in a little more detail, it may be noted that the matrix equation (1) hereinbefore presented is really a compact and convenient way of representing the set of $r$ equations $$h_{11}\, d_n \oplus h_{12}\, d_{n-1} \oplus \ldots\ldots\ldots\ldots \oplus h_{1n}\, d_1 = 0$$
$$h_{21}\, d_n \oplus \ldots\ldots\ldots\ldots\ldots\ldots\ldots\ldots \oplus h_{2n}\, d_1 = 0$$
$$h_{r1}\, d_n \oplus \ldots\ldots\ldots\ldots\ldots\ldots\ldots \oplus h_{rn}\, d_1 = 0 \qquad (3)$$

where the sign $\oplus$ represents modulo-two addition and the coefficients $h$ are the elements of the parity-check matrix H. Since we are dealing with chosen codes and binary signals, the coefficients $h$ can only be 0 or 1. Every term for which the coefficient $h$ is 0 can be omitted, and every term for which the coefficient $h$ is 1 will simply be equal to the digit $d$ which it includes. Hence each equation of the set is really only stating a condition that a certain selection of the digits to be transmitted must have a modulo-two sum equal to zero; that is to say, the selection must include an even number of one digits, zero being regarded as an even number. In effect each equation forms a rule for generating one of the parity-check digits from one or some or all of the information digits by a modulo-two summation. Hence the parity-check encoder circuits need only comprise modulo-two adder circuits, and can all operate simultaneously, summing different combinations of the information digits. It will be convenient to assume that the parity check matrix is arranged so that the elements $h_{11}$, $h_{22}$, $h_{33}$ . . . . $h_{rr}$ are all ones and the other elements in the first $r$ columns are all zeros. Then the equations of the set (3) will in practice reduce to a form $d_n$ = modulo-two sum of a first given set of information digits $d_{n-1}$ = modulo-two sum of a second given set of information digits $d_{k+1}$ = modulo-two sum of an $r$th set of information digits (4)

This will be illustrated hereinafter with reference to some of the preferred codes.

Figure 2:
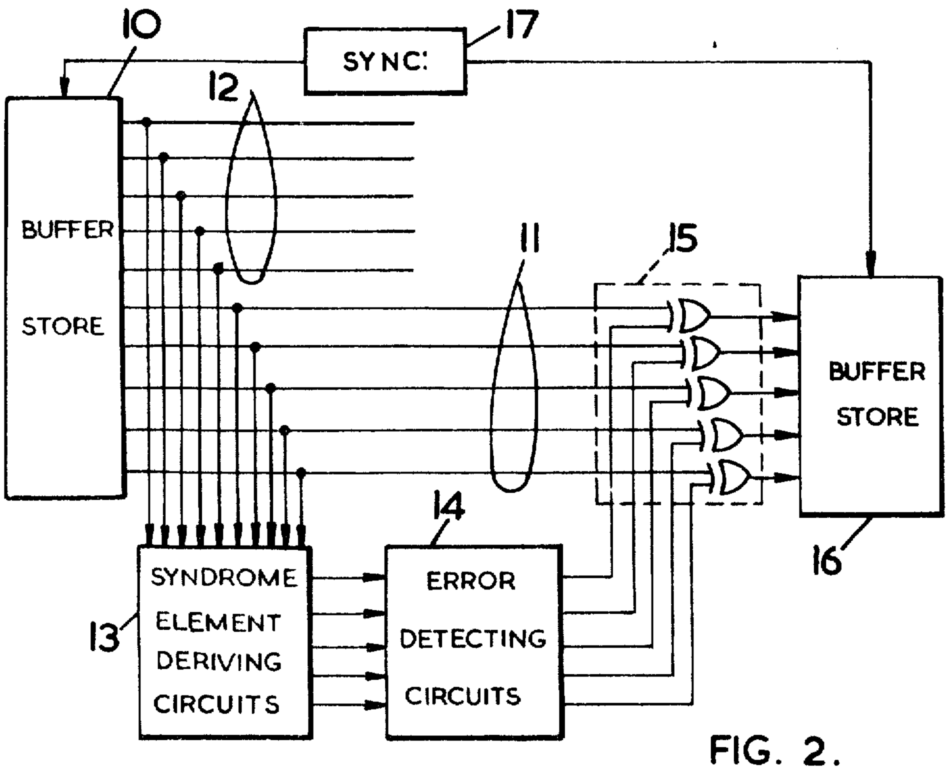
FIG. 2 is a schematic block circuit diagram of apparatus for decoding signals according to an $(n, k, t)$ systematic block code.

FIG. 2 shows checking apparatus, including a buffer store 10 which is arranged to receive the blocks of signals by any suitable means not shown. The buffer store 10 has a total of $n$ parallel outputs, comprising $k$ outputs 11, to which it is arranged to apply the information-digit signals, and $r$ outputs 12, to which it is arranged to apply the parity-check digit signals. A set of circuits 13, with inputs connected to the outputs of the store 10 comprises $r$ syndrome-element deriving circuits with separate outputs. There is a set 14 of $k$ error-detecting circuits which have separate outputs and which have inputs connected to receive various combinations of the outputs of the circuits 13. A set of correcting gates 15 comprises $k$ modulo-two adders, each having one input connected to one of the lines 11 and one input connected to a corresponding one of the error-detecting circuits. The outputs of the correcting-gates 15 are separately connected to $k$ parallel inputs of a buffer store 16. A synchronizing circuit 17 controls the entry of signals into the store 10 and the output of signals from the store 16.

In operation, the store 10 applies the digit signals of a received block simultaneously to its respective outputs. The syndrome-element deriving circuits operate simultaneously, responding to different combinations of the outputs of the store 10, each deriving one element of the syndrome of the block of received signals according to the code in use. In view of the relationship between the matrix equations (1) and (2) it is not surprising that the syndrome-element deriving circuits may be very similar to the parity-check encoder circuits for the same code. In fact, it follows from these equations that each syndrome element can be derived by a modulo-two summation of all the terms in a corresponding one of the equations (4). That is to say $S_1 = e_n \oplus$ the modulo-two sum of the said first given set of information digits (as received)

$S_r = e_{k+1} \oplus$ the modulo-two sum of the said $r$th given set of information digits (as received). (5)

In the specific examples hereinafter given of circuits for the preferred codes it will be seen that each syndrome-element deriving circuit is like the corresponding parity-check encoder circuit with one extra input and one extra modulo-two adder circuit.

Each of the error-detecting circuits 14 includes a majority-voting circuit connected to receive a combination of syndrome-element signals such that the threshold of the majority-voting circuit should be exceeded if and only if an associated one of the information-digit signals has been corrupted or wrongly identified. For any incorrect information-digit, the asociated error-detecting circuit will develop a one signal output; for each correct information-digit, the associated error-detecting circuit will develop a zero signal output. Modulo-two summation of these signals with the information-digit signals (in the correcting gates) will complement the incorrect signals and leave the correct signals unchanged.

It should be particularly noted that there is no need to provide any circuits for correcting, or even detecting the occurrence of any errors among the parity-check digits; they can be erased without correction once the syndrome elements have been derived.

It will also be noted that the appropriate number of input lines and output lines of various units depend on $k$ or $r$ and will therefore have to be changed according to the code in use. FIGS. 1 and 2 are schematic in showing the general arrangement of interconnections, without showing the exact number of lines required for any particular code.

For convenience, the detailed circuits for the preferred codes will now be described as though they were provided completely separately. In the following descriptions the information-digits to be encoded are numbered from $d_0$ to $d_{k-1}$ and the parity-check digits are numbered from $d_k$ to $d_{n-1}$; in the decoder circuits the information-digits as received are numbered from $e_0$ to $e_{k-1}$ and the received parity-check digits are numbered from $e_k$ to $e_{n-1}$. The syndrome digits are numbered from $s_0$ to $s_{r-1}$. Where the complete system is under consideration (e.g., with reference to FIG. 9 and in the claims) the parity-check digits derived by the encoder will be represented by the symbols $c_1$ to $c_r$ to avoid any confusion with signals possibly occurring on those input lines which are ignored in the relevant mode of operation.

Figures 3, 4:
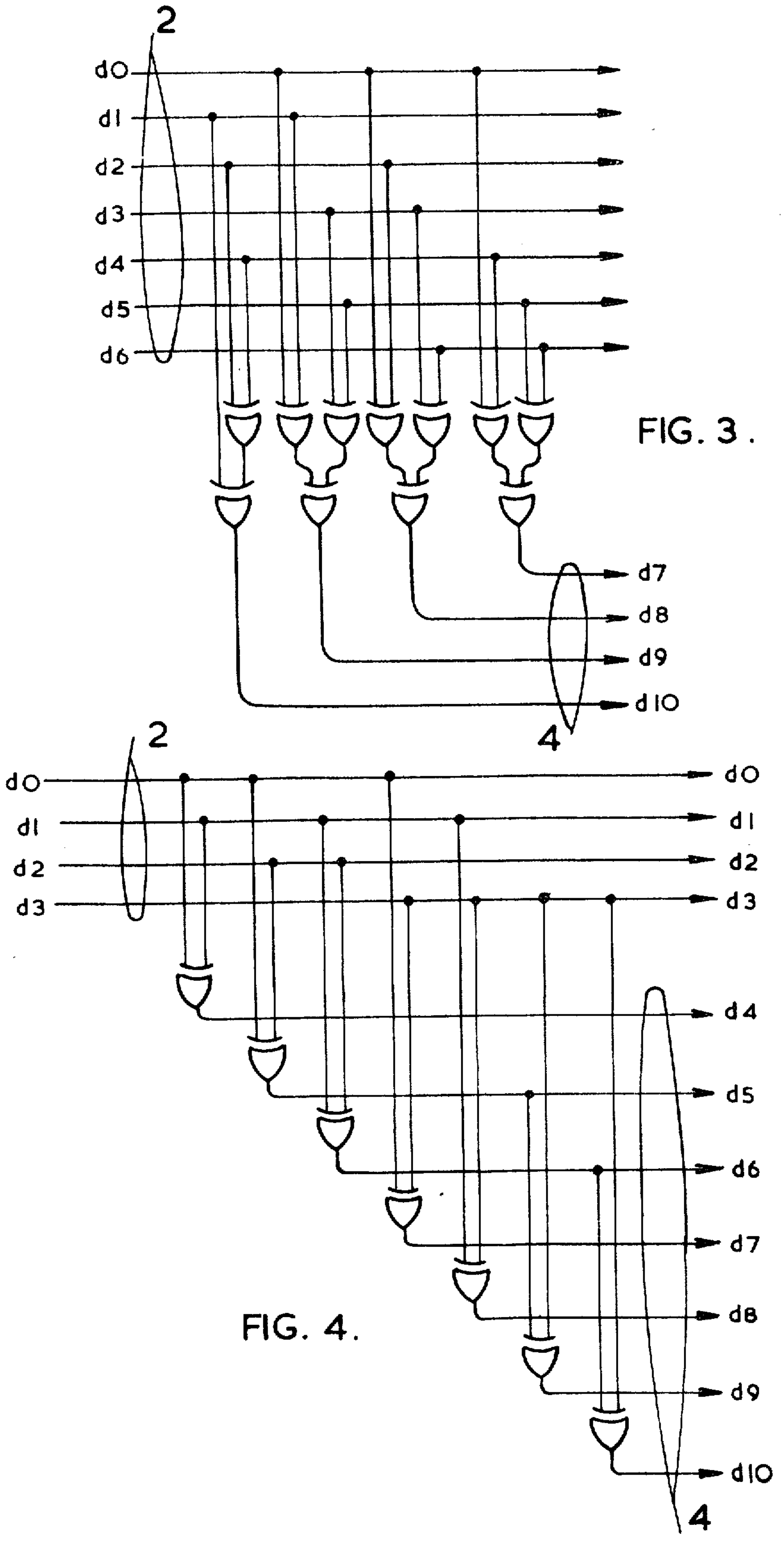
FIGS. 3, 4 and 5 are circuit diagrams of encoder apparatus for the (11, 7, 1) code, the (11, 4, 2) code, and the (11, 2, 3) code respectively.

FIG. 3 shows the parity-check encoder circuits for the preferred (11, 7, 1) code, hereinafter called mode seven. The lines 2 from the store 1 are shown labelled with the references of the information-digit signals which are applied to them. For this code, the equations (3) and (4) become $$\begin{aligned} d_{10} &= d_4 \oplus d_2 \oplus d_1 = c_4 \\ d_9 &= d_5 \oplus d_3 \oplus d_1 \oplus d_0 = c_3 \\ d_8 &= d_6 \oplus d_3 \oplus d_2 \oplus d_0 = c_2 \\ d_7 &= d_6 \oplus d_5 \oplus d_4 \oplus d_0 = c_1 \end{aligned} \qquad (6)$$

and FIG. 3 shows a simple arrangement of modulo-two adder circuits for deriving these parity-check digits.

Figures 5, 6:
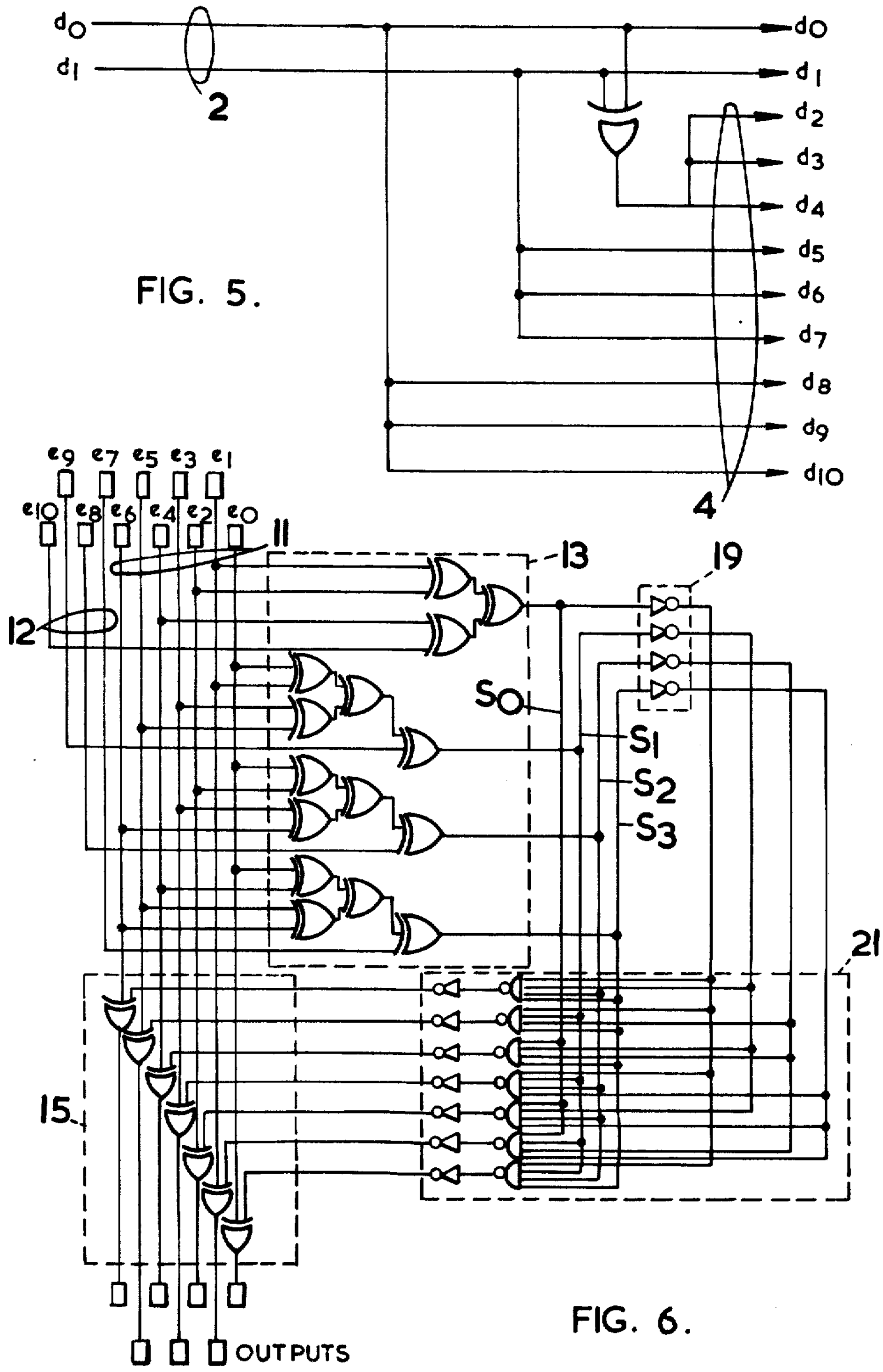
FIGS. 6, 7 and 8 are circuit diagrams of decoder apparatus for the (11, 7, 1) code, the (11, 4, 2) code, and the (11, 2, 3) code respectively.

The corresponding decoder circuit may be as shown in FIG. 6. The equations (5) for the mode seven code become $$\begin{aligned} S_0 &= e_{10} \oplus e_4 \oplus e_2 \oplus e_1 \\ S_1 &= e_9 \oplus e_5 \oplus e_3 \oplus e_1 \oplus e_0 \\ S_2 &= e_8 \oplus e_6 \oplus e_3 \oplus e_2 \oplus e_0 \\ S_3 &= e_7 \oplus e_6 \oplus e_5 \oplus e_4 \oplus e_0 \end{aligned} \qquad (7)$$

and the syndrome deriving circuits 13 of FIG. 6 as shown clearly incorporate the arrangement of modulo-two adders used in FIG. 3.

The equations (1), (2) and (3) associate the information digits with the last $k$ columns of the parity check matrix; in the matrix multiplication the elements of the last column are multiplied by the first information digit $e_0$, the elements of the second last column are multiplied by the second information digit $e_1$, and so on. It follows that if one and only one of the information digits is in error, the positions of the 1's in the corresponding column of the parity-check matrix will determine which of the syndrome elements will be altered by the error. For instance, the last column of the parity-check matrix for the mode seven code has a zero in the first row and 1's in the other rows; it follows that an error in $e_0$, if it is the only error in the block, will leave $S_0 = 0$ but will make $S_1$, $S_2$ and $S_3$ all 1's.

The error-detecting part of FIG. 6 is directly derived from these considerations. Inverter circuits 19 are connected to the outputs of the syndrome-element deriving circuit 13, to make available the inverse or complement of each syndrome-element signal. Each of the error-detecting gates 21 is a four-input coincidence gate with its inputs connected to receive a combination of signals determined according to the elements in a corresponding column of the parity-check matrix; thus the gate for detecting errors in $e_0$ (the lowest one of the gates 21 in FIG. 6) has inputs connected to receive $S_3$, $S_2$, $S_1$ and the inverse of $S_0$ respectively corresponding to the 1's and 0's in the last column of the parity-check matrix. The next gate up in the drawing, for detecting errors in $e_1$, has inputs connected to receive $S_0$, $S_1$ the inverse of $S_2$, and the inverse of $S_3$, corresponding to the 1's and 0's in the second last column of the parity-check matrix.

Figure 7:
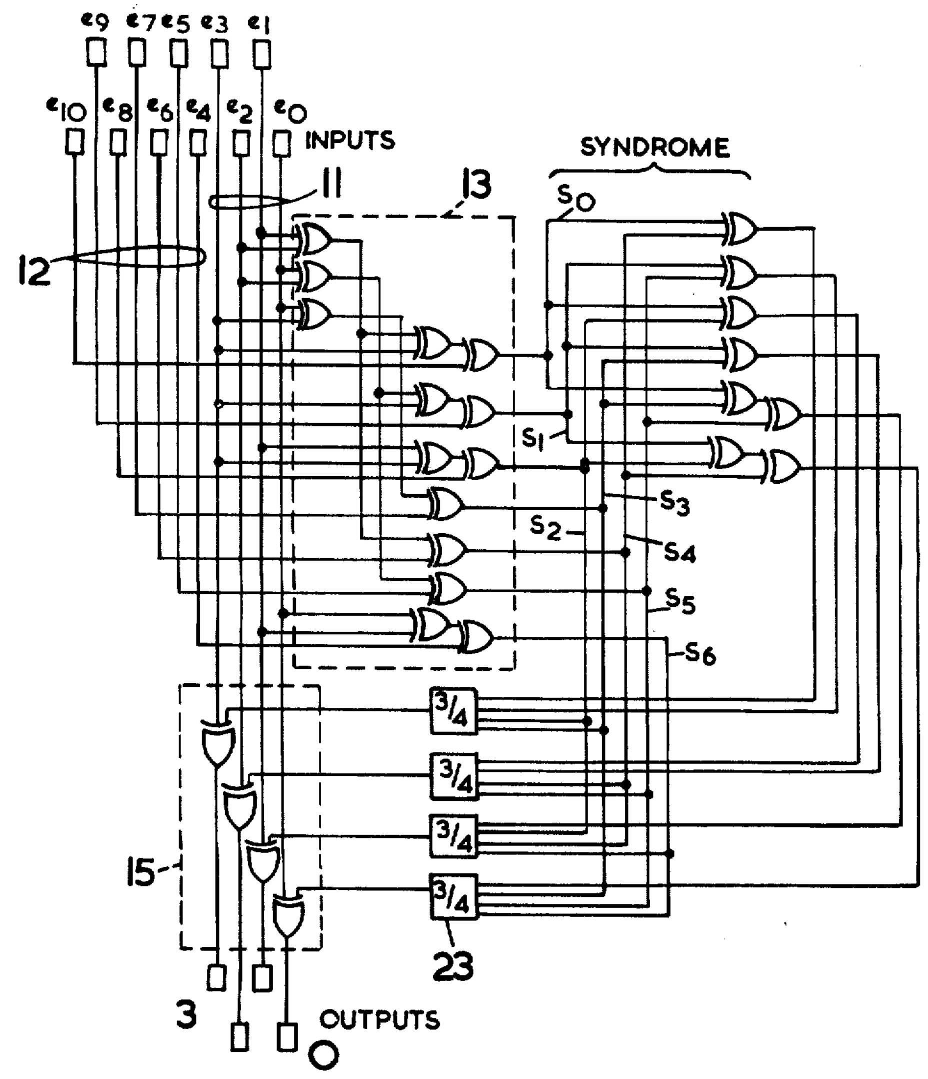

FIG. 4 shows parity-check encoder circuits for the preferred (11, 4, 2) code, hereinafter called mode four. As shown, the seven parity-check digits can be derived by seven modulo-two adders. The corresponding decoder circuits are shown in FIG. 7. The equations for this code are $$\left.\begin{aligned} d_{10} &= d_3 \oplus d_2 \oplus d_1 = c_7 \\ d_9 &= d_3 \oplus d_2 \oplus d_0 = c_6 \\ d_8 &= d_3 \oplus d_1 = c_5 \\ d_7 &= d_3 \oplus d_0 = c_4 \\ d_6 &= d_2 \oplus d_1 = c_3 \\ d_5 &= d_2 \oplus d_0 = c_2 \\ d_4 &= d_1 \oplus d_0 = c_1 \end{aligned}\right\} \qquad (8)$$

$$\left.\begin{aligned} S_0 &= e_{10} \oplus e_3 \oplus e_2 \oplus e_1 \\ S_1 &= e_9 \oplus e_3 \oplus e_2 \oplus e_0 \\ S_2 &= e_8 \oplus e_3 \oplus e_1 \\ S_3 &= e_7 \oplus e_3 \oplus e_0 \\ S_4 &= e_6 \oplus e_2 \oplus e_1 \\ S_5 &= e_5 \oplus e_2 \oplus e_0 \\ S_6 &= e_4 \oplus e_1 \oplus e_0 \end{aligned}\right\} \qquad (9)$$

Note that the syndrome-deriving circuits 13 in FIG. 5 do not correspond quite so closely to the parity-check encoder circuits (FIG. 4) in this case. The encoder circuits are simplified because $d_5 = d_0 \oplus d_2$ and $d_6 = d_1 \oplus d_2$, but in the decoder it is not satisfactory to assume that $e_6 = e_1 \oplus e_2$ or $e_5 = e_0 \oplus e_2$. The derivation of the error-detecting circuits is also a little more involved.

From inspection of the parity-check matrix, it can be seen that the syndrome element $S_6$ can be affected by errors in $e_4$, $e_1$ and/or $e_0$; the syndrome element $S_5$ can be affected by errors in $e_5$, $e_2$ and/or $e_0$; the syndrome element $S_3$ can be affected by errors in $e_7$, $e_3$ and/or $e_0$. By a modulo-two summation of the second, third and fifth rows of the matrix, it can be shown that the sum $(S_1 \oplus S_2 \oplus S_4)$ can be affected by $e_9$, $e_8$, $e_6$ and/or $e_0$. These four quantities, $S_6$, $S_5$, $S_3$ and $(S_1 \oplus S_2 \oplus S_4)$ are selected because they involve different syndrome elements, and while an error in $e_0$ will affect all four of them, no other error can affect more than one of the four quantties. Thus if an error in $e_0$ is the only error in the block, all four quantities will be 1's. If there are errors in $e_o$ and any one other received digit, three of the four quantities will be 1's. Any other single error will make only one of the quantities 1, and any other pair of errors will make just two of the quantities equal to 1. Hence signals indicating these four quantities are applied to separate inputs of a majority voting circuit or threshold gate 23 which is constructed to provide a one output when any three or all of its inputs receive one signals.

By inspection and some trial and error experimentation, other such sets of four quantities are selected for similarly detecting errors in the other information digits $e_1$, $e_2$ and $e_3$. Thus errors in $e_1$ are identified because they will make at least three of the quantities $S_2$, $S_4$, $S_6$ and $(S_0 \oplus S_3 \oplus S_5)$ equal to 1; errors in $e_2$ are identified because they will make at least three of the quantities $S_4$, $S_5$, $(S_0 \oplus S_2)$ and $(S_1 \oplus S_3)$ equal to 1; and errors in $e_3$ are identified because they will make at least three of the quantities $S_2$, $S_3$, $(S_0 \oplus S_4)$ and $(S_1 \oplus S_5)$ equal to 1. The error-detecting circuits shown in FIG. 7 clearly follow directly from these considerations.

Figure 8:
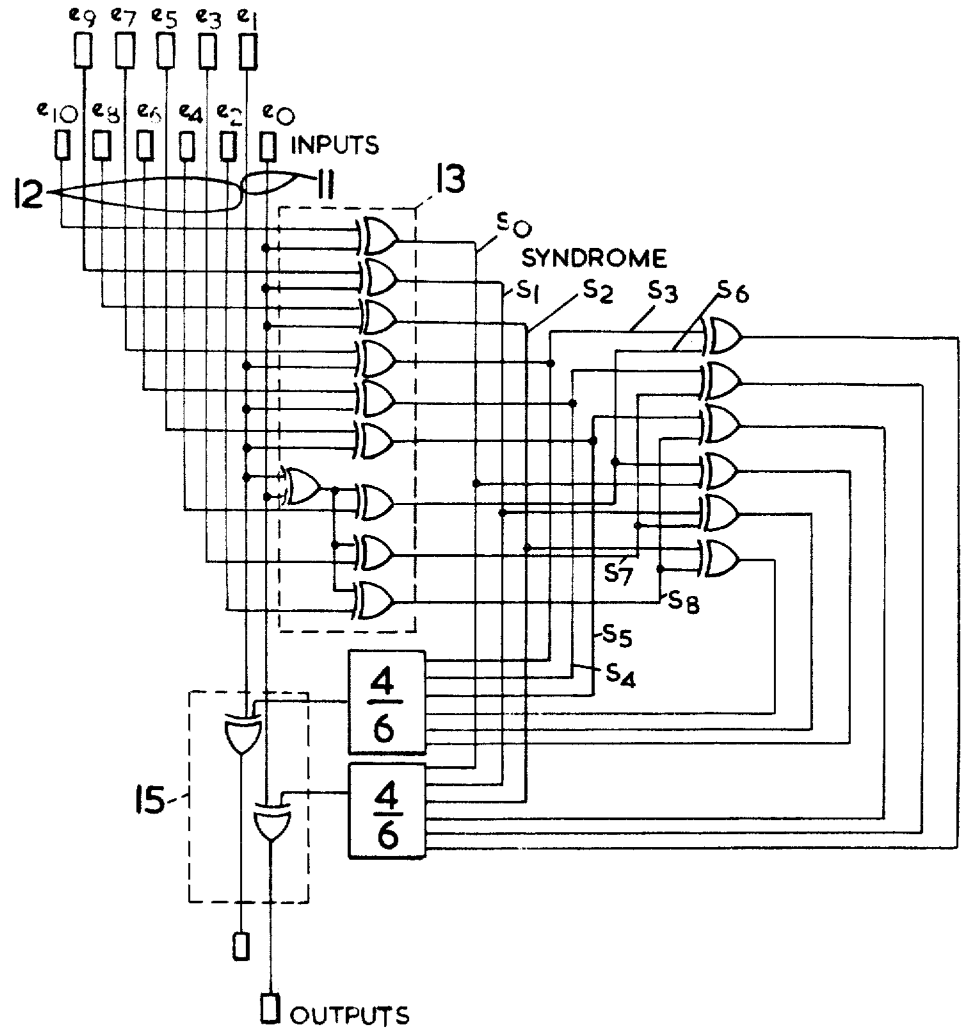

FIG. 5 shows the parity-check encoder circuits for the preferred (11, 2, 3) code, hereinafter called mode two. This code requires only one modulo-two adder and some direct connections to form the required parity-check digits. FIG. 8 shows the corresponding decoder circuits. The equations for this code are

| | |
|---|---|
| $d_{10} = d_o$ | $S_o = e_{10} \oplus e_o$ |
| $d_9 = d_o$ | $S_1 = e_9 \oplus e_o$ |
| $d_8 = d_o$ | $S_2 = e_8 \oplus e_o$ |
| $d_7 = d_1$ | $S_3 = e_7 \oplus e_1$ |
| $d_6 = d_1$ | $S_4 = e_6 \oplus e_1$ |
| $d_5 = d_1$ | $S_5 = e_5 \oplus e_1$ |
| $d_4 = d_1 \oplus d_o$ | $S_6 = e_4 \oplus e_1 \oplus e_o$ |
| $d_3 = d_1 \oplus d_o$ | $S_7 = e_3 \oplus e_1 \oplus e_o$ |
| $d_2 = d_1 \oplus d_o$ | $S_8 = e_2 \oplus e_1 \oplus e_o$ |

In the error-detecting circuits of FIG. 8, the blocks marked 4/6 are majority voting circuits of threshold gates each constructed to produce a one signal output when any four or more of their inputs receive one signal inputs. An error in $e_o$ is identified because it will make at least four of the six quantities $S_o$, $S_1$, $S_2$, $(S_5 \oplus S_8)$, $(S_4 \oplus S_7)$, and $(S_3 \oplus S_6)$ equal to one. An error in $e_1$ is identified because it will make at least four out of the six quantities $S_3$, $S_4$, $S_5$, $(S_2 \oplus S_8)$, $(S_1 \oplus S_7)$ and $(S_0 \oplus S_6)$ equal to 1. No possible combinations of any three errors can confuse these identifications.

For the (11, 1, 5) mode, hereinafter called mode one, the arrangements required are very simple. Encoding is simply a matter of repeating each information-digit eleven times. Decoding requires only a majority voting circuit or threshold gate which will provide a one output when any six or more signals in any block are one signals.

Clearly, some straightforward modifications are possible, and some parts may be utilized in more than one of the modes of operation of the apparatus. The buffer stores could be shift registers, arranged to use an appropriate number of stages according to the mode of operation.

Figure 9:
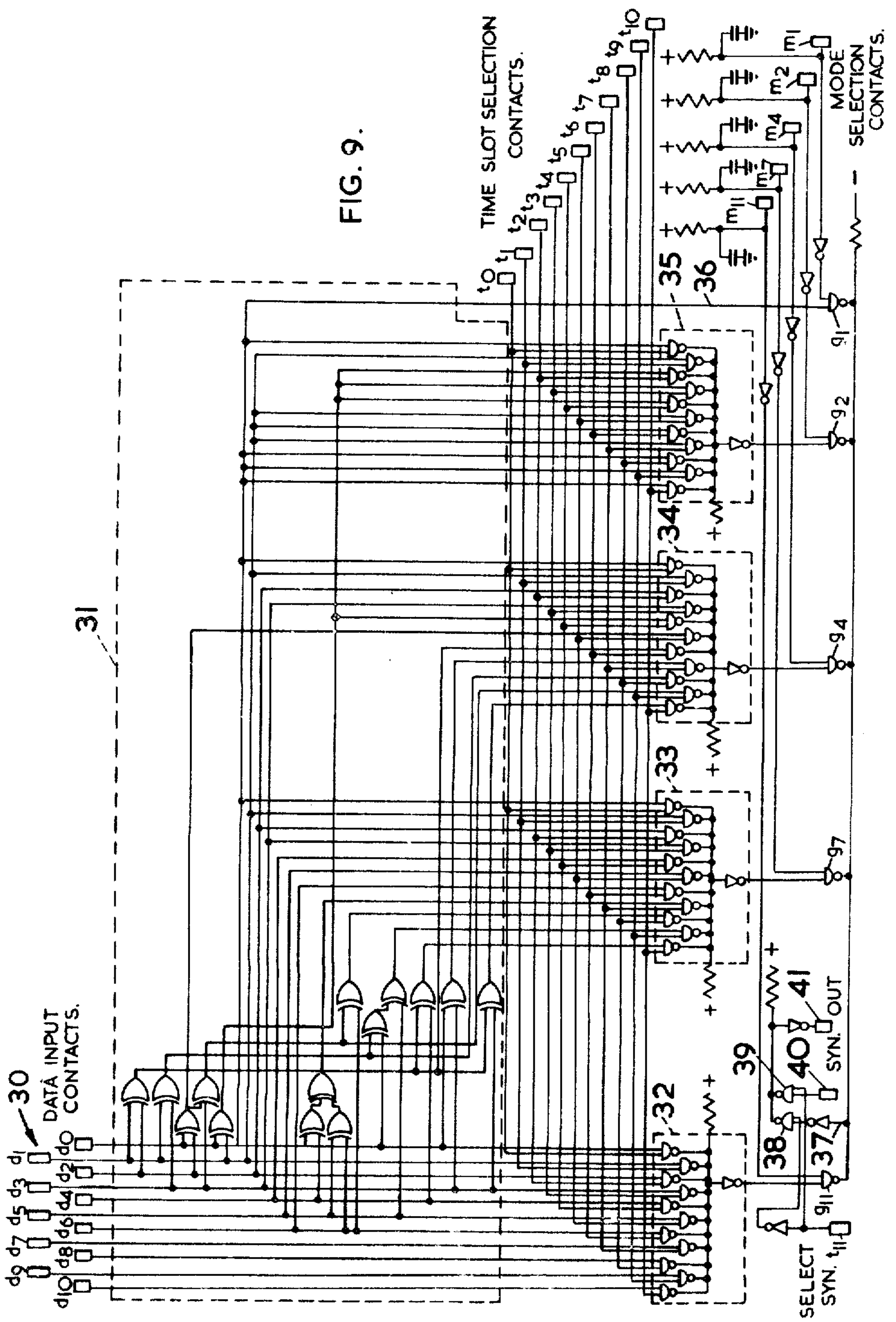
FIG. 9 shows a combined arrangement of encoding and code selecting circuits.

The apparatus may be used in a multiplex communications system wherein the $k$ information digits in each block are taken from separate channels, thus providing a facility for transmitting signals from $k$ channels where $k$ varies according to the code in use. The code in use may be selected according to prevailing transmission conditions and reliability requirements for the messages to be sent, or according to the number of channels required at any given time. FIG. 9 shows an encoding and multiplexing apparatus for such a system. The apparatus has data input contacts 30, which are labelled with the suffixes of the signals which they receive, according to the notation hereinbefore used. In the application of the apparatus, these signals come from separate channels (not shown). The apparatus can operate in any one of five modes, hereinafter called mode eleven, mode seven, mode four, mode two, and mode one respectively, according to the number of channels which they make operative. The encoder circuits, comprising modulo-two adders and connections as shown within the line 31, perform parity-check encoding operations for operations in mode seven, mode four, and mode two. These encoder circuits in effect form a combination of circuits as shown in FIGS. 3, 4 and 5 with some slight modifications which allow the necessary operations to be achieved with fewer adders, without altering their functional effect. The multiplexing operations are controlled by a set of time-slot selection contacts, $t_o$, $t_1$, $t_2$, . . . $t_{10}$, $t_{11}$; the contact $t_{11}$ appears in the lower left-hand corner of FIG. 9 while the other are shown on the right-hand side. In operation these time-slot selection contacts are connected to a timing circuit (not shown) which connects the contacts in turn sequentially so that they are energized consecutively in successive time-slots. One set of multiplexing gates is provided for each of the modes eleven, seven, four and two.

The gates 32 pass signals for mode eleven; they comprise eleven NAND-gates each having one input connected to one of the time-slot selection contacts ($t_o$ to $t_{10}$) and other input connected to a corresponding one of the data input contacts 30. The eleven NAND-gates have their outputs all connected to a single inverter. Another, similar, set 33 of 11 NAND-gates and an inverter pass signals for mode seven; in this set the seven gates having inputs connected to the time-slot selection contacts $t_o$ to $t_6$ have their other inputs directly connected to the first seven of the data input contacts 30, but the other four gates are connected to receive the mode seven parity-check digit signals($c_1$ to $c_4$ in equations 6) from the encoder circuit 31. similarly a set 34 of eleven NAND-gates and an inverter pass signals for mode four; in this set the four gates having in0puts connected to the time-slot selection contacts $t_o$ to $t_3$ have their other inputs connected to the first four of the data input contacts 30 and the other seven gates are connected to receive the mode four parity-check digit signals ($c_1$ to $c_7$ in equations 8) from the encoder circuit 31. Another set 35 is connected to pass signals for mode two.

The outputs from the inverters of the sets of gates 32, 33, 34 and 35 are connected to NAND-gates $g_{11}$, $g_7$, $g_4$ and $g_2$ respectively. Another NAND-gate $g_1$ has one input directly connected to the first of the data input contacts 30; this is for mode one operation, in which the signal from the first data input contact is sent throughout eleven time-slots in each block. The gates $g_{11}$, $g_7$, $g_4$, $g_2$ and $g_1$ are controlled by signals applied to corresponding mode selection contacts $m_{11}$, $m_7$, $m_4$, $m_2$ and $m_1$ so that any one and only one at a time will pass the miltiplexed data signals. thus for instance when mode four is to be used, signals are applied to the mode selection contacts so that only the gate $g_4$ is enabled to pass data signals. the outputs of the gates $g_{11}$, $g_7$, $g_4$, $g_2$ and $g_1$ are all connected by a line 37 and an inverter to one input of a gate 38. The twelfth time-slot selection contact $t_{11}$ is connected to control a gate 39 directly, and controls the gate 38 through an inverter. The gate 39 is connected to receive synchronization and systems control signals from an input connection 40. The outputs of the gates 38 and 39 are connected by an inverter to the output connection 41 of the apparatus. Thus in operation coded data signals of a selected mode are passed through the line 37 and gate 38 to the output 41 while the time-slot selection contacts $t_0$ to $t_{10}$ are consecutively energized, then a synchronizing or system control signal is sent from the input 40 via gate 39 while the contact $t_{11}$ is energized, and then another cycle begins.

Figure 10:
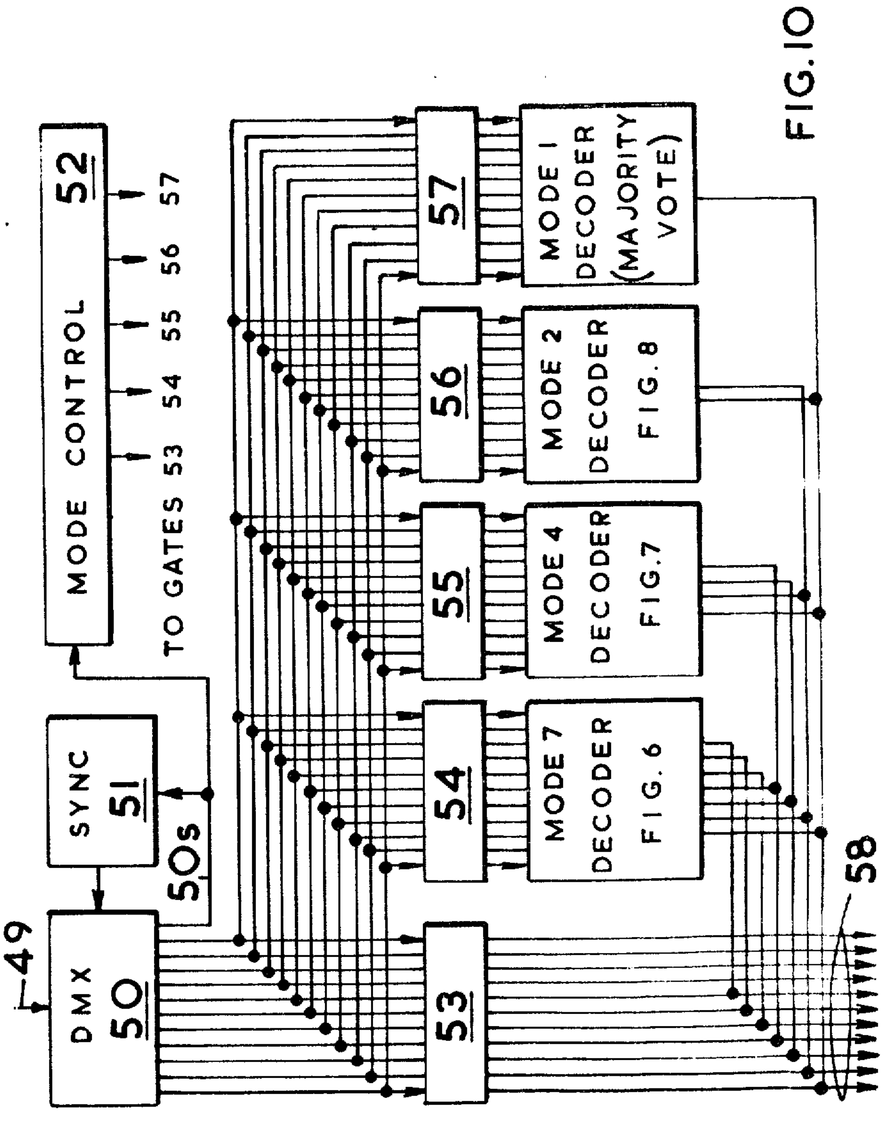
FIG. 10 is a schematic circuit diagram of demultiplexing and decoding apparatus for use with the apparatus of FIG. 9.

FIG. 10 shows the general arrangement of demultiplexing and decoding apparatus for use in conjunction with apparatus as shown in FIG. 9. It has an input 49 connected to a demultiplexer circuit 50 which is constructed to distribute consecutive bit-signals cyclically to twelve output lines, eleven of which are connected in parallel to sets of gates 53, 54, 55, 56 and 57. The twelfth output line (referenced 50S in FIG. 10) is connected to a synchronization circuit 51 and a mode control circuit 52. The synchronization circuit 51 controls the demultiplexer 50 and the mode control circuit 52 cntrols the sets of gates 53 to 57. The outputs of gates 53 are directly connected to the output lines 58 of the apparatus, while the outputs of the other sets of gates 54 to 57 are connected to appropriate ones of these lines 58 through decoder circuits as hereinbefore described.

In operation, the input 49 will receive (through some telecommunications link not shown) signals coded by an apparatus like FIG. 9 at a distant station. The demultiplexer 50 is made so that its synchronization initially tends to drift until the synchronizing signals (every twelfth bit-signal) appear on the line 50S. The synchronizing signals have a pattern involving comparatively long sequences of consecutive zeros and consecutive ones which causes the synchronizing circuit 51 to develop a voltage which is applied to stabilize the synchronization of the demultiplexer 50 in a conventional manner. On a longer timescale the pattern of the sequences of zeros and ones in the synchronizing signals is used to indicate the mode in use, and the mode control circuit 52 is constructed to detect this and enable the appropriate one of the sets of gates 53 to 57 to pass the coded data signals. In an alternative arrangement the gates 54 to 57 could be connected in the lines from the decoders to the output lines 58, reducing the number of gates required.

We claim:

1. Multiplexing and encoding apparatus which comprises:
   - input connection means comprising $n$ separate input lines for accepting information bit-signals in parallel from $n$ distinct channels;
   - first encoder means connected to a subset of $k_1$ of the said $n$ input lines, for deriving $(n-k_1)$ check-bit signals from any set of $k_1$ information-bit signals occurring one on each of the lines of the said subset, according to a first predetermined systematic block code;
   - second encoder means connected to a subset of $k_2$ of the said $n$ input lines, for deriving $(n-k_2)$ check-bit signals from any set of $k_2$ information-bit signals occurring one on each of the lines of the said subset, according to a second predetermined systematic block code;
   - and output means for applying the information-bit signals and check-bit signals from any selected encoder means to an output channel;
   - wherein $n>k_1>k_2>0$, and the said predetermined block codes have a common block length $n$.

2. Multiplexing and encoding apparatus as claimed in claim 1 wherein $n = 11$, $k_1 = 7$, $k_2 = 4$, the said first predetermined systematic block code is an (11, 7, 1) code, and the said second predetermined systematic block code is an (11, 4, 2) code.

3. Multiplexing and encoding apparatus as claimed in claim 1 wherein $n = 11$, said apparatus comprising an encoder means connected to two of the said $n$ input lines for deriving 9 check-bit signals from any pair of information-bit signals occurring one on each of the said two input lines according to a predetermined (11, 2, 3) systematic block code.

4. Multiplexing and encoding apparatus as claimed in claim 1 and also comprising another encoder means which provides a connection from one of the said input lines via the output means to the output channel, for duplicating each signal occurring on the third one of the input lines n times on the output channel in which $(n - 1)$ duplications are provided as check signals.

5. Multiplexing and encoding apparatus as claimed in claim 1 wherein the said first predetermined systematic block code is selected from the set of codes comprising the code having the parity-check matrix $$\begin{bmatrix} 10000010110 \\ 01000101011 \\ 00101001101 \\ 00011110001 \end{bmatrix}$$

and all substantially equivalent codes.

6. Multiplexing and encoding apparatus as claimed in claim 1 wherein one of the said predetermined systematic block codes is selected from the set of codes comprising the code having the parity-check matrix $$\begin{bmatrix} 10000001110 \\ 01000001101 \\ 00100001010 \\ 00010001001 \\ 00001000110 \\ 00000100101 \\ 00000010011 \end{bmatrix}$$

and all substantially equivalent codes.

7. Multiplexing and encoding apparatus as claimed in claim 1 wherein one of the said predetermined systematic block codes is selected from the set of codes comprising the code having the parity-check matrix $$\begin{bmatrix} 10000000001 \\ 01000000001 \\ 00100000001 \\ 00010000010 \\ 00001000010 \\ 00000100010 \\ 00000100010 \\ 00000010011 \\ 00000001011 \end{bmatrix}$$

and all substantially equivalent codes.

8. Multiplexing and encoding apparatus as claimed in claim 2 wherein the said $n$ input lines being numbered 0, 1, 2, . . . $(n-1)$ respectively and the information-bit signals occurring on the input lines being correspondingly represented by symbols $d_o, d_1, d_2, \ldots . d_{n-1}$, the first encoder means comprises modulo-2 adders and connection means operative to derive check-bit signals $c_1, c_2, c_3, c_4$ according to the equations $$c_4 = d_4 \oplus d_2 \oplus d_1$$
$$c_3 = d_5 \oplus d_3 \oplus d_1 \oplus d_o$$
$$c_2 = d_6 \oplus d_3 \oplus d_2 \oplus d_o$$
$$c_1 = d_6 \oplus d_5 \oplus d_4 \oplus d_o$$

and connection means for applying the check-bit signals $c_1$ to $c_4$ and the information-bit signals $d_o$ to $d_6$ to the output means.

9. Multiplexing and encoding apparatus as claimed in claim 8 and wherein the second encoder means comprises modulo -2 adders and connection means operative to derive check-bit signals $c_1$ to $c_7$ according to the equations $$c_7 = d_3 \oplus d_2 \oplus d_1$$
$$c_6 = d_3 \oplus d_2 \oplus d_o$$
$$c_5 = d_3 \oplus d_1$$
$$c_4 = d_3 \oplus d_o$$
$$c_3 = d_2 \oplus d_1$$
$$c_2 = d_2 \oplus d_o$$
$$c_1 = d_1 \oplus d_o$$

and connection means for applying the check-bit signals $c_1$ to $c_7$ and the information-bit signals $d_o$ to $d_3$ to the output means.

10. Multiplexing and encoding apparatus as claimed in claim 9 comprising a third encoder means which comprises modulo-2 adders and connection means operative to derive check-bit signals $c_1$ to $c_9$ according to the equations $c_1 = c_2 = c_3 = d_o \oplus d_1$ $c_4 = c_5 = c_6 = d_1$ $c_7 = c_8 = c_9 = d_o$ connection means for applying the check-bit signals $c_1$ to $c_9$ and the information-bit signals $d_o$ and $d_1$ to the output means, and a further encoder means which includes a connection for applying the information-bit signal $d_o$ to the output means.

11. Demultiplexing and decoder apparatus which comprises:

output connection means comprising $n$ separate output lines for applying decoded and corrected information-bit signals to $n$ distinct channels;

demultiplexing means for applying signals received in distinct bit-signal positions of a multiplex transmission format to $n$ separate data lines;

first decoder means for decoding and correcting errors in sets of $n$ bit-signals occurring concurrently one on each of the said $n$ data lines of the said demultiplexing means, according to a first predetermined systematic $(n, k_1, t)$ block code, and for applying the $k_1$ correct and corrected information-bit signals thereof to a subset comprising $k_1$ predetermined ones of the said $n$ separate output lines of the output connection means;

second decoder means for decoding and correcting errors in sets of $n$ bit-signals occurring concurrently one on each of the said $n$ data lines of the said demultiplexing means, according to a second predetermined systematic $(n, k_2, t)$ block code, and for applying the $k_2$ correct and corrected information-bit signals thereof to a subset comprising $k_2$ predetermined ones of the said $n$ separate output lines of the output connection means;

and control means for rendering any selected one of the encoder means operative to respond to the signals on the said $n$ data lines and to apply correct and corrected information-bit signals to at least some of the said $n$ separate output lines of the output connection means;

wherein $n>k_1>k_2>0$ and the said predetermined systematic block codes have a common block length $n$.

12. Demultiplexing and decoder apparatus as claimed in claim 11 wherein $n= 11$, $k_1= 7$, $k_2= 4$, the said first predetermined systematic block code is an (11, 7, 1) code, and the said second predetermined systematic block code is an (11, 4, 2) code.

13. Demultiplexing and decoder apparatus as claimed in claim 11 comprising a decoder means for decoding and correcting errors in sets of $n$ bit-signals occurring concurrently one on each of the said $n$ data lines of the said demultiplexing means, according to a predetermined systematic (11, 2, 3) block code and for applying the two correct and corrected information-bit signals thereof to a subset comprising two of the said $n$ separate output lines of the output connection means.

14. Demultiplexing and decoder apparatus as claimed in claim 11 and also comprising another decoder means which comprises a majority voting circuit connected to the said $n$ data lines and responsive to any signal occurring on a majority of the said $n$ data lines.

15. Demultiplexing and decoder apparatus as claimed in claim 11 wherein the said first predetermined systematic block code is selected from the set of codes comprising the code having the parity-check matrix $$\begin{bmatrix} 10000010110 \\ 01000101011 \\ 00101001101 \\ 00011110001 \end{bmatrix}$$

and all substantially equivalent codes.

16. Demultiplexing and decoder apparatus as claimed in claim 11 wherein the said second predetermined systematic block code is selected from the set of codes comprising the code having the parity-check matrix $$\begin{bmatrix} 10000001110 \\ 01000001101 \\ 00100001010 \\ 00010001001 \\ 00001000110 \\ 00000100101 \\ 00000010011 \end{bmatrix}$$

and all substantially equivalent codes.

17. Demultiplexing and decoder apparatus as claimed in claim 11 wherein the said second predetermined systematic block code is selected from the set of codes comprising the code having the parity-check matrix $$\begin{bmatrix} 10000000001 \\ 01000000001 \\ 00100000001 \\ 00010000010 \\ 00001000010 \\ 00000100010 \\ 00000010011 \\ 00000001011 \\ 00000000111 \end{bmatrix}$$

and all substantially equivalent codes.

18. Demultiplexing and decoder apparatus as claimed in claim 15 wherein the $n$ data lines being numbered from 0, 1, 2 . . . . ($n - 1$) respectively and the bit-signals occurring on them being correspondingly represented by symbols $e_o, e_1, e_2, \ldots . e_{n-1}$, the first decoder means comprises:

modulo-2 adders connected to derive syndrome-bit signals according to the equations $S_o = e_{10} \oplus e_4 \oplus e_2 \oplus e_1$ $S_1 = e_9 \oplus e_5 \oplus e_3 \oplus e_1 \oplus e_o$ $S_2 = e_8 \oplus e_6 \oplus e_3 \oplus e_2 \oplus e_o$ $S_3 = e_7 \oplus e_6 \oplus e_5 \oplus e_4 \oplus e_o$ seven error detector means connected to the outputs of the modulo-2 adders and responsive to the syndromes 0111, 1100, 1010, 0110, 1001, 0101, and 0011, respectively;

and seven correction means each connected to receive a separate one of the signals $e_o$ to $e_6$ and any output from an associated one of the error detector means for complementing erroneous signals indicated by the corresponding syndromes.

19. Demultiplexing and decoder apparatus as claimed in claim 16 wherein the said $n$ data lines being numbered 0, 1, 2 . . . ($n - 1$) respectively and the bit-signals occurring on them being correspondingly represented by symbols $e_o, e_1, e_2 \ldots e_{n-1}$, the second decoder means comprises:

modulo-2 adders connected to derive syndrome-bit signals and combinations thereof according to the equations $S_o = e_{10} \oplus e_3 \oplus e_2 \oplus e_1$ $S_1 = e_9 \oplus e_3 \oplus e_2 \oplus e_o$ $S_2 = e_8 \oplus e_3 \oplus e_1$ $S_3 = e_7 \oplus e_3 \oplus e_o$ $S_4 = e_6 \oplus e_2 \oplus e_1$ $S_5 = e_5 \oplus e_2 \oplus e_o$ $S_6 = e_4 \oplus e_1 \oplus e_o$ $S_1 \oplus S_2 \oplus S_4 = e_9 \oplus e_8 \oplus e_6 \oplus e_o$ $S_3 \oplus S_5 = e_{10} \oplus e_7 \oplus e_5 \oplus e_1$ $S_o \oplus S_2 = e_{10} \oplus e_8 \oplus e_2$ $S_1 \oplus S_3 = e_9 \oplus e_7 \oplus e_2$ $S_o \oplus S_4 = e_{10} \oplus e_6 \oplus e_3$ $S_1 \oplus S_5 = e_9 \oplus e_5 \oplus e_3$ first voting circuit means responsive to combinations of the syndrome-bit signals which make any three of the signals $S_6$, $S_5$, $S_3$ and $(S_1 \oplus S_2 \oplus S_4)$ equal to 1;

second voting circuit means responsive to combinations of the syndrome-bit signals which make any three of the signals $S_2$, $S_4$, $S_6$ and $(S_o \oplus S_3 \oplus S_5)$ equal to 1;

third voting circuit means responsive to combinations of the syndrome-bit signals which make any three of the signals $S_4$, $S_5$, $(S_o \oplus S_2)$, and $(S_1 \oplus S_3)$ equal to 1;

fourth voting circuit means responsive to combinations of the syndrome-bit signals which make any three of the signals $S_2$, $S_3$, $(S_o \oplus S_4)$, and $(S_1 \oplus S_5)$ equal to 1;

first correction means having inputs connected to receive the signal $e_o$ and the output from the first voting circuit means for correcting any error in $e_o$ indicated by the output of the first voting circuit means;

second correction means having inputs connected to receive the signal $e_1$ and the output from the second voting circuit means for correcting any error in $e_1$ indicated by the output of the second voting circuit means;

third correction means having inputs connected to receive the signal $e_2$ and the output from the third voting circuit means for correcting any error in $e_2$ indicated by the output of the third voting circuit means; and fourth correction means having inputs connected to receive the signal $e_3$ and the out0ut from the fourth voting circuit means for correcting any error in $e_3$ indicated by the output of the fourth voting circuit means.

20. Demultiplexing and decoder apparatus as claimed in claim 13 wherein, the said $n$ data lines being numbered 0, 1, 2 . . . ($n$-1) respectively and the bit-signals occurring on them being correspondingly represented by symbols $e_o, e_1, e_2 \ldots e_{n-1}$, the said decoder means comprises:

modulo-2 adders connected to derive syndrome-bit signals and combinations thereof according to the equations $S_o = e_{10} \oplus e_0$ $S_1 = e_9 \oplus e_o$ $S_1 = e_8 \oplus e_o$ $S_3 = e_7 \oplus e_1$ $S_4 = e_6 \oplus e_1$ $S_5 = e_5 \oplus e_1$ $S_6 = e_4 \oplus e_1 + e_o$ $S_7 = e_3 \oplus e_1 + e_o$ $S_8 = e_2 \oplus e_1 + e_o$ $S_5 \oplus S_8 = e_5 \oplus e_2 \oplus e_o$ $S_4 \oplus S_7 = e_6 \oplus e_3 \oplus e_o$ $S_3 \oplus S_6 = e_7 \oplus e_4 \oplus e_o$ $S_2 \oplus S_8 = e_8 \oplus e_2 \oplus e_1$ $S_1 \oplus S_7 = e_9 \oplus e_3 \oplus e_1$ $S_o \oplus S_6 = e_{10} \oplus e_4 \oplus e_1$ first voting circuit means responsive to combinations of the syndrome-bit signals which make any four of the signals $S_o$, $S_1$, $S_2$, $(S_5 \oplus S_8)$, $(S_4 \oplus S_7)$, and $(S_3 \oplus S_6) = 1$;

second voting circuit means responsive to combinations of the syndrome-bit signals which make any four of the signals $S_3$, $S_4$, $S_5$, $(S_2 \oplus S_8)$, $(S_1 \oplus S_7)$ and $(S_o \oplus S_6) = 1$;

first correction means having inputs connected to receive the signal $e_o$ and the output from the first voting circuit means for correcting any error in $e_o$ indicated by the first voting cirucit means; and second correction means having inputs connected to receive the signal $e_1$ and the output of the second voting circuit means for correcting any error in $e_1$ indicated by the second voting circuit means.

* * * * *